US008105153B2

(12) United States Patent
Buecheler et al.

(10) Patent No.: US 8,105,153 B2
(45) Date of Patent: Jan. 31, 2012

(54) METHOD AND SYSTEM FOR DYNAMICALLY LEVELING GAME PLAY IN ELECTRONIC GAMING ENVIRONMENTS

(75) Inventors: Kurt Buecheler, Palo Alto, CA (US); Peter Sauers, San Mateo, CA (US); C. Rowland Hanson, Redmond, WA (US); David Cantu, Woodinville, WA (US)

(73) Assignee: Dugac Remote Systems, LLC, Wilmington, DE (US)

( * ) Notice: Subject to any disclaimer, the term of this patent is extended or adjusted under 35 U.S.C. 154(b) by 0 days.

(21) Appl. No.: 11/955,205

(22) Filed: Dec. 12, 2007

(65) Prior Publication Data

US 2008/0261680 A1 Oct. 23, 2008

Related U.S. Application Data

(63) Continuation of application No. 10/889,985, filed on Jul. 12, 2004, now abandoned.

(60) Provisional application No. 60/486,672, filed on Jul. 11, 2003, provisional application No. 60/577,446, filed on Jun. 4, 2004.

(51) Int. Cl.
*A63F 9/24* (2006.01)
*A63F 13/00* (2006.01)

(52) U.S. Cl. ............................................ 463/23; 463/29

(58) Field of Classification Search .................... 463/23, 463/29, 40, 42, 43; 434/322
See application file for complete search history.

(56) References Cited

U.S. PATENT DOCUMENTS 4,285,517 A * 8/1981 Morrison .......................... 463/9
4,657,247 A * 4/1987 Okada ............................ 463/23
4,679,789 A * 7/1987 Okada ............................ 463/23
4,858,930 A * 8/1989 Sato ............................... 463/23
4,907,808 A * 3/1990 Turner et al. .................. 273/240
5,083,271 A * 1/1992 Thacher et al. ................. 700/92
5,645,279 A * 7/1997 Reutlinger .................... 273/249
5,683,082 A * 11/1997 Takemoto et al. ........ 273/121 B
5,779,549 A * 7/1998 Walker et al. ................... 463/42
5,813,913 A * 9/1998 Berner et al. .................. 463/40
6,162,120 A * 12/2000 Takahashi et al. ................ 463/8
6,174,237 B1 * 1/2001 Stephenson ...................... 463/42
6,224,486 B1 * 5/2001 Walker et al. ................... 463/42
6,302,792 B1 * 10/2001 Arai et al. ....................... 463/23
6,352,479 B1 * 3/2002 Sparks, II ....................... 463/42
6,358,148 B1 * 3/2002 Tanaka ............................ 463/23
6,511,069 B1 * 1/2003 Nurse ........................ 273/244.2
6,648,760 B1 * 11/2003 Nicastro ......................... 463/23

(Continued)

OTHER PUBLICATIONS

"Kralizec's Dynamic Problem Creation and Adaptation Techniques", accessed Dec. 5, 2005 at http://www.kralizec.net.*

(Continued)

*Primary Examiner* — Melba Bumgarner
*Assistant Examiner* — Steven J Hylinski
(74) *Attorney, Agent, or Firm* — Perkins Coie LLP

(57) ABSTRACT

Methods and systems for automatically determining game content based upon dynamically adjusted individual skill levels are provided. Example embodiments provide an Electronic Gaming Engine ("EGE"), which includes a Dynamic Challenge Level Adjuster for supporting multi-player, individualized skill-based games. In one embodiment, the EGE comprises game flow logic; game content models, for example, question and answer ("Q&A") challenge models; a Dynamic Challenge Level Adjuster; one or more scoring modules; challenge data; participant data; and an input/output interface. These components cooperate to determine and assign skill level indexes on an individual basis and to automatically present game content appropriate to each individual player's skill level.

47 Claims, 8 Drawing Sheets

U.S. PATENT DOCUMENTS

| | | | | |
|---|---|---|---|---|
| 6,801,751 | B1 * | 10/2004 | Wood et al. | 434/362 |
| 6,887,159 | B2 * | 5/2005 | Leen et al. | 463/42 |
| 6,913,536 | B2 * | 7/2005 | Tomizawa et al. | 463/43 |
| 6,988,096 | B2 * | 1/2006 | Gupta et al. | 1/1 |
| 7,192,352 | B2 * | 3/2007 | Walker et al. | 463/42 |
| 7,390,255 | B2 * | 6/2008 | Walker et al. | 463/9 |
| 7,438,642 | B2 * | 10/2008 | Walker et al. | 463/30 |
| 2001/0004609 | A1 * | 6/2001 | Walker et al. | 463/42 |
| 2001/0024974 | A1 * | 9/2001 | Cohen | 463/42 |
| 2002/0032708 | A1 * | 3/2002 | Gupta et al. | 707/539 |
| 2004/0043770 | A1 * | 3/2004 | Amit et al. | 455/450 |
| 2004/0097287 | A1 * | 5/2004 | Postrel | 463/41 |
| 2004/0127289 | A1 * | 7/2004 | Davis et al. | 463/42 |
| 2004/0224775 | A1 * | 11/2004 | Wood et al. | 463/43 |
| 2006/0211462 | A1 * | 9/2006 | French et al. | 463/1 |

OTHER PUBLICATIONS

"AI for Dynamic Difficulty Adjustment in Games" by Robin Hunicke and Vernell Chapman, from p. 91 of the technical report titled Challenges in Game Aricificial Intelligence—Papers from the 2004 AAAI Workshop.*

* cited by examiner

METHOD AND SYSTEM FOR DYNAMICALLY LEVELING GAME PLAY IN ELECTRONIC GAMING ENVIRONMENTS

CROSS-REFERENCES TO RELATED APPLICATIONS

This application is a continuation application of commonly assigned U.S. patent application Ser. No. 10/889,985 entitled "METHOD AND SYSTEM FOR DYNAMICALLY LEVELING GAME PLAY IN ELECTRONIC GAMING ENVIRONMENTS," filed on Jul. 12, 2004 now abandoned, which claims priority to U.S. Provisional Patent Application No. 60/486,672 entitled "METHOD AND SYSTEM FOR AUTOMATIC HANDICAPPING IN ELECTRONIC GAMING ENVIRONMENTS," filed Jul. 11, 2003, and to U.S. Provisional Patent Application No. 60/577,446 entitled "DVD GAME ARCHITECTURE," filed Jun. 4, 2004. All of the above applications are incorporated herein by reference thereto.

BACKGROUND OF THE INVENTION

1. Field of the Invention

The present invention relates to methods and systems for providing for competitive game play between players having different skill characteristics and, in particular, to methods and systems for dynamically adjusting game aspects to account for varied skill levels of multiple players while playing electronic based games.

2. Background Information

To date, the ability for players of different skills or age levels to simultaneously and competitively play a single game that is perceived as fair to all players is limited. This is especially true of question and answer based games, trivia games, or other games that typically require knowledge that is often related to factors such as age and experience. Often, if a game is played at the child's level, the adult gets bored. Similarly, if the game is played at the adult's level, the child gets frustrated.

Some attempts have been made to solve these problems in board game environments. For example, some games have sought to provide age or skill appropriate questions on cards (multiple questions per card) and each player is responsible for choosing the level at which the player wishes to answer the question.

In some electronic game environments that involve competition between multiple players (typically games requiring motor skill and dexterity), skill level is typically determined at the outset of the game and effects all players of the game. Thus, for example, one of the players can choose to play an "easy" version of a car racing game or more difficult version, etc. To change the skill-based level of play, the game typically requires restarting at a new skill level.

BRIEF SUMMARY OF THE INVENTION

Embodiments of the present invention provide enhanced computer- and network-based methods and systems for automatically and dynamically providing skill-based game content on an individualized basis yet preserving competition between game participants, all within the confines of a single game. Different participants can simultaneously and competitively play the same game at each participant's individual skill level in a manner that is most comfortable to the participant. Example embodiments provide a Dynamic Challenge Level Adjuster ("DCLA" or "Level Adjuster") for carrying out the techniques for automatically determining game content based upon dynamically adjusted individual skill levels. In one embodiment, the Level Adjuster is included as part of an Electronic Gaming Engine ("EGE"), which provides a runtime environment for electronic games. The DCLA determines an initial skill level index for each participant, either receiving an indication of a skill level from the participant or determining one automatically, for example based upon queries or sample challenges. When automatic adjustment of skill levels is enabled, the DCLA adjusts a skill level index of a participant as the game progresses, for example, based upon the correctness of a response to a prior challenge. When appropriate, the DCLA determines a corresponding challenge level based upon the current skill level index of a participant, and uses the determined challenge level (or the skill level index) to automatically select a next challenge to be presented to the participant.

In one example embodiment, the Electronic Gaming Engine comprises one or more functional components/modules that work together to provide game flow, game content, dynamic adjustment of skill and/or challenge level, scoring, and other capabilities. One skilled in the art will recognize that these components may be implemented in software or hardware or a combination of both. The example EGE illustrates how a level adjuster may be integrated into an electronic game environment or engine. For example, an Electronic Gaming Engine may comprise game flow logic; game content models, for example, challenge models; a dynamic challenge level adjuster; one or more scoring modules; challenge data; participant data; and an input/output interface.

According to one approach, a method is provided to, for each turn of each participant, automatically select a next challenge based upon the current skill level index of a current participant; present the selected challenge and receive a response; and dynamically adjust the current skill level index of the current participant based upon the received response, so that the adjusted skill level index will be used the next time that participant's turn arises. The adjustment of skill level may take place at other times, such as periodically, before challenges are presented, or at other times. The adjustment may take the form of an increase or a decrease, and may be associated with the correctness of a response to the presented challenge.

An initial value for the skill level index may be indicated by a selection of skill level by a participant or automatically by a game. According to one approach, the game presents queries to the participant related to age, knowledge, or experience. According to another approach, the game presents sample challenges that are indicative of particular skill levels and then chooses a level based upon the participant's responses.

DETAILED DESCRIPTION OF THE INVENTION

Figure 1:
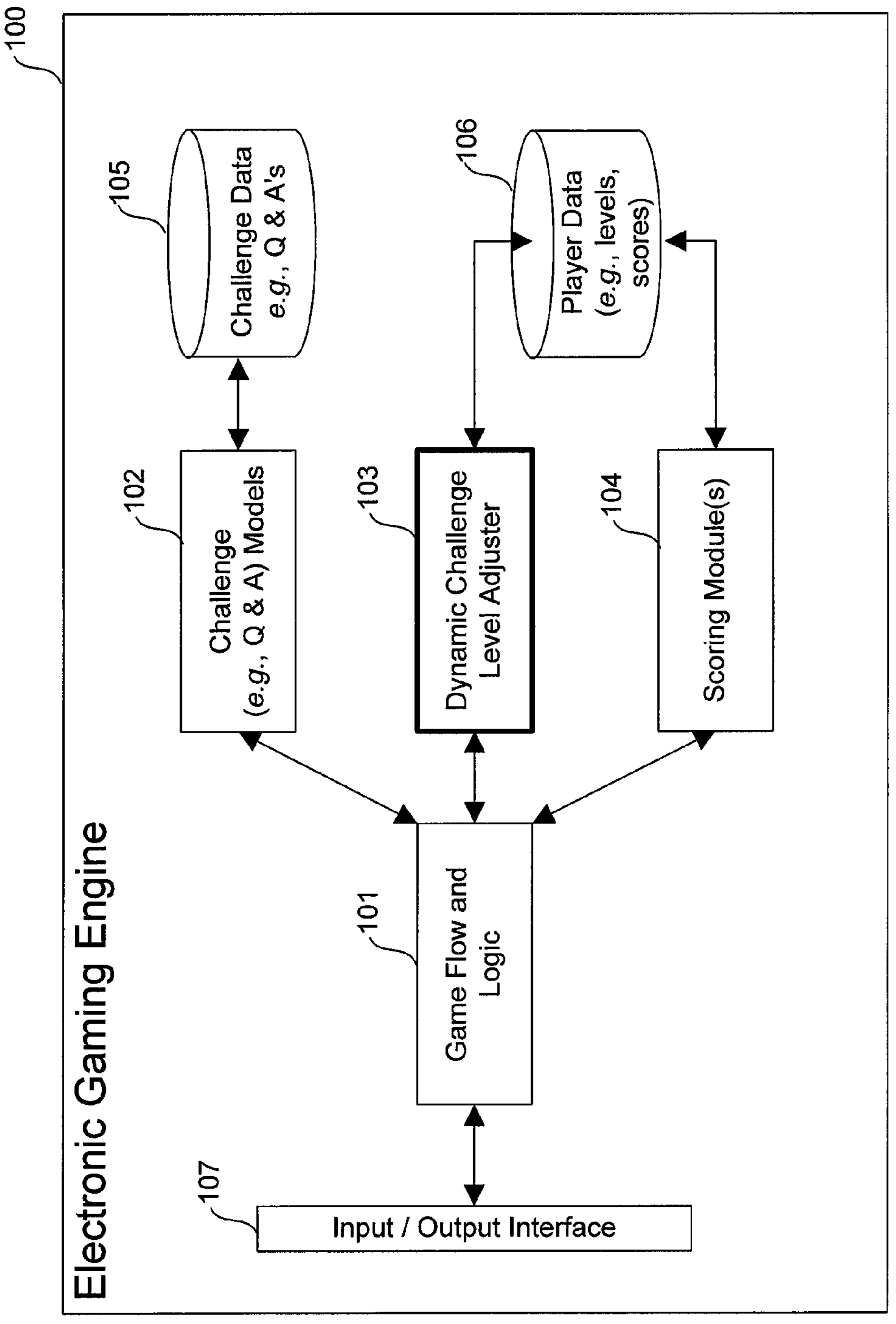
FIG. 1 is a block diagram of components an example Electronic Gaming Engine including a Dynamic Challenge Level Adjuster.

Embodiments of the present invention provide enhanced computer- and network-based methods and systems for automatically and dynamically providing skill-based game content on an individualized basis yet preserving competition between game participants within the confines of a single game. The encompassed techniques "level the playing field" between the participants, thus enhancing the overall competitive environment provided by the game. In this way, different participants can simultaneously and competitively play the same game at each participant's individual skill level in a manner that is most comfortable to the participant. For example, an adult can compete with a young child in a trivia-based contest and both experience a constructive level of challenge while playing each other.

Example embodiments provide a Dynamic Challenge Level Adjuster ("DCLA" or "Level Adjuster") for carrying out the techniques for adjusting game play content. In one embodiment, the DCLA is included as part of an Electronic Gaming Engine ("EGE"), which provides a runtime environment for electronic games. The EGE provides the basic components needed to integrate different types of challenges, for example, multiple-choice question and answer challenges, into an electronic game. Games that are created using the EGE therefore automatically provide multi-player skills-based game play based upon an individual's skill level. One skilled in the art will recognize, however, that a DCLA can be integrated into games other than those created using an EGE and into other game environments and gaming engines.

The term "skill level" refers to some measure of skill of a participant. It may be a measure of various age criteria, experience criteria, or knowledge criteria, etc. A "skill level index" or "handicap index" is some indication of a participant's skill level. In some embodiments, it may be treated as disadvantaging the more skilled players; in other embodiments, it may be treated as advantaging the less skilled players.

The term "challenge level" refers to the level of the challenges (game content) presented by the game, and, depending upon the particular implementation, may or may not map directly to participants' skill levels. For example, challenges may be grouped into different levels, yet each challenge level may map to a range of skill levels. Each game provides logic regarding how a participant is moved between skill levels and, potentially, between challenge levels. In one embodiment of a DVD-based game called TimeTroopers™, three challenge levels, "cadet," "captain," and "commander," are mapped to ranges of skill levels (from 0-14). In that game, as each challenge is answered, the participant's skill level increases for correct answers and decreases for incorrect answers. When the participant's skill level crosses a challenge level "boundary" (for example moves from skill level 4 to skill level 5), challenges from the group of challenges associated with the next harder challenge level are presented by the game. One skilled in the art will recognize that many different variations of mapping skill levels to challenge levels can be created and many different logic paths for how movement between skill levels and between challenge levels is accomplished. It is contemplated that the techniques of the present invention can be incorporated into any such scheme.

A participant's initial skill level (hence a skill level index) can either be manually chosen by the participant or automatically determined at the game outset by the game logic. To automatically determine an initial skill level for a participant, the game may query the participant for specific information, such as age, year in school or grade level, travel history, etc., or may present sample challenges to the participant that are indicative of various skill levels. Once set, a participant's skill level index either remains constant (static) for the remainder of the game, or is dynamically modified while the game is progressing based upon the participant's responses to game challenges (or some other metric). In either case, the skill level index is used to automatically determine the next game challenge for that participant. For example, in a question and answer trivia-based game, a participant's skill level index is used by the game to select a next question for that participant.

FIG. 1 is a block diagram of components an example Electronic Gaming Engine including a Dynamic Challenge Level Adjuster. In one example embodiment, the Electronic Gaming Engine comprises one or more functional components/modules that work together to provide game flow, game content, dynamic adjustment of skill and/or challenge level, scoring, and other capabilities. One skilled in the art will recognize that these components may be implemented in software or hardware or a combination of both. The example EGE illustrates how a DCLA may be integrated into an electronic game environment or game engine. In FIG. 1, an Electronic Gaming Engine comprises game flow logic 101; game content models, for example, question and answer ("Q&A") challenge models 102; a dynamic challenge level adjuster ("DCLA") 103; one or more scoring modules 104; challenge data 105; participant (player) data 106; and an input/output interface 107. The game flow logic 101 provides the flow of the game, from participant to participant, from round to round. It selects appropriate game content using the challenge models 102, the challenge data 105, and the participant data 106; presents the selected content via interface 107; invokes the DCLA to adjust the skill level for a current participant; and scores the participant's responses using scoring module (s) 104, storing the new scores in participant data 106 and advancing or retreating the participant as indicated on a scoreboard.

In one embodiment of the EGE, the scoreboard is an electronic scoreboard, such as that described in U.S. Provisional Application No. 60/577,446, entitled "DVD Game Architecture." One skilled in the art will recognize, however, that the EGE can also be used in conjunction with an external scoreboard, such as a separate game board or other physical object. In that case, the "pieces" representing the participants are not moved automatically by the game, but the remaining functions are performed electronically by the game. Other variations and combinations are also possible.

The game content models 102 provide the logic, if any, for the various content provided by the game. In the case of a game that presents challenges, the challenge models 102 provide specific logic for each type of challenge. For example, a true/false challenge may require different logic than a timed-response multiple-choice challenge that has moving answers and detects when a participant selects the correct answer in a different manner than for true/false challenges. The challenge models 102 retrieve data for challenge presentation from the challenge data 105. The challenge data 105 may be stored in a data repository, such as a database, a file, or other equivalent means for storing data. The challenge data 105 may include any type of visual, audio, or tactile content, such as video clips, audio clips, animation, still images, graphics, text, etc.

When the game participants have specified that dynamic adjustment of skill levels is desirable, the dynamic challenge level adjuster 103 receives the result of a challenge and determines an adjustment for the participant whose "turn" it is. This adjustment is then typically stored in the participant data 106. The participant data 106 may be stored in a data repository that is the same or separate from the challenge data repository 105.

The scoring module 104 also receives the result of the challenge and determines a score based upon the result. (More than one scoring module may be provided for different types of games.) The new score is then stored with the participant's data 106. In some embodiments, the DCLA and scoring is combined, although other arrangements are operable.

Figure 2:
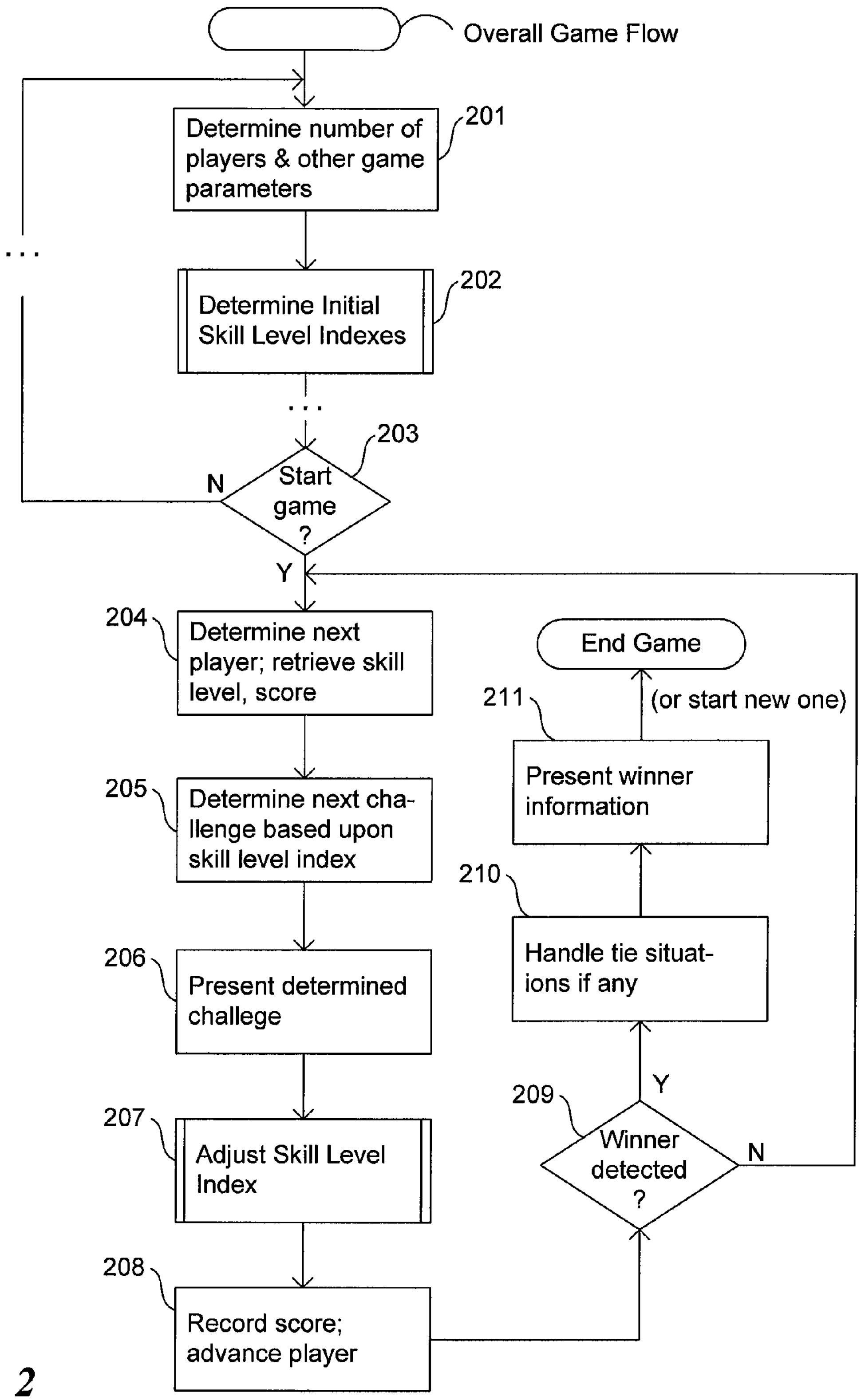
FIG. 2 is an example flow diagram of an overview of example game flow provided by an Electronic Gaming Engine.

FIG. 2 is an example flow diagram of an overview of example game flow provided by an Electronic Gaming Engine. This overview demonstrates how an example DCLA can be integrated into game flow (whether or not generated using an EGE). One skilled in the art will recognize that one or more of the steps shown in FIG. 2 and the techniques described in the remaining figures can be integrated into a variety of games including question and answer games, for example trivia-based games, puzzles, interactive narratives, etc., and that any example games discussed are just that, examples. In addition, although discussed primarily in terms of games, the techniques discussed herein can be applied to other types of environments such as testing, training, and for certification purposes, educational purposes, or purposes other than entertainment. In the following description, numerous specific details are set forth, such as data formats and code sequences, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow. Also, other steps could be implemented for each routine, and in different orders, and in different routines, yet still achieve the functions of the EGE and of the DCLA.

In step 201, the game determines the number of participants (game players) and other game parameters, such as whether dynamic skill level adjustment is to be utilized and whether initial skill levels are to be determined automatically. In some scenarios, the participants are not given a choice, but instead the game determines the DCLA functionality provided. In step 202, the game determines an initial skill level index for each participant. Again, this can be performed manually or automatically by the DCLA. A routine for determining initial skill level indexes is described with reference to FIG. 3. Eventually, in step 203 (other activity may occur in the interim), when game play is initiated, the game continues in step 204, otherwise returns to one or more of the setup steps, for example, steps 201-202. In step 204, the game determines which participant's turn is next, designates the determined participant as the current participant, and retrieves a corresponding skill level index and score for the current participant. In step 205, the game determines a next challenge for the current participant based upon the retrieved skill level index. Note that, upon subsequent turns for this participant, this index may have been dynamically adjusted by the DCLA to indicate that challenge content should be selected from a different challenge level. In step 206, the game presents the determined challenge to the current participant and obtains a response. In step 207, (assuming that dynamic skill level adjustment has been enabled), the game invokes the DCLA to adjust the skill level index of the current participant and/or a challenge level associated with that participant. A routine for performing these adjustments is described with reference to FIG. 5. In step 208, the game records the score for the current participant and advances the participant on the scoreboard as appropriate. In some embodiments, scoring may be integrated in with the DCLA, such as in games where the DCLA is always operative and automatic skill level adjustment enabled. In step 209, the game determines whether the current participant has won the game (dependent on the game logic, for example, because there may be more than one winner or no winner if the round is incomplete), and, if so, continues in step 210, otherwise continues in step 204 to select start a next participant's turn. In step 210, the game handles any "tie" situations if applicable. In step 211, the game presents winner information, and then ends. In some scenarios, the game may return to step 203 to allow the participants to begin a new game. Also, one skilled in the art will recognize that other and different steps may be provided.

Figure 3:
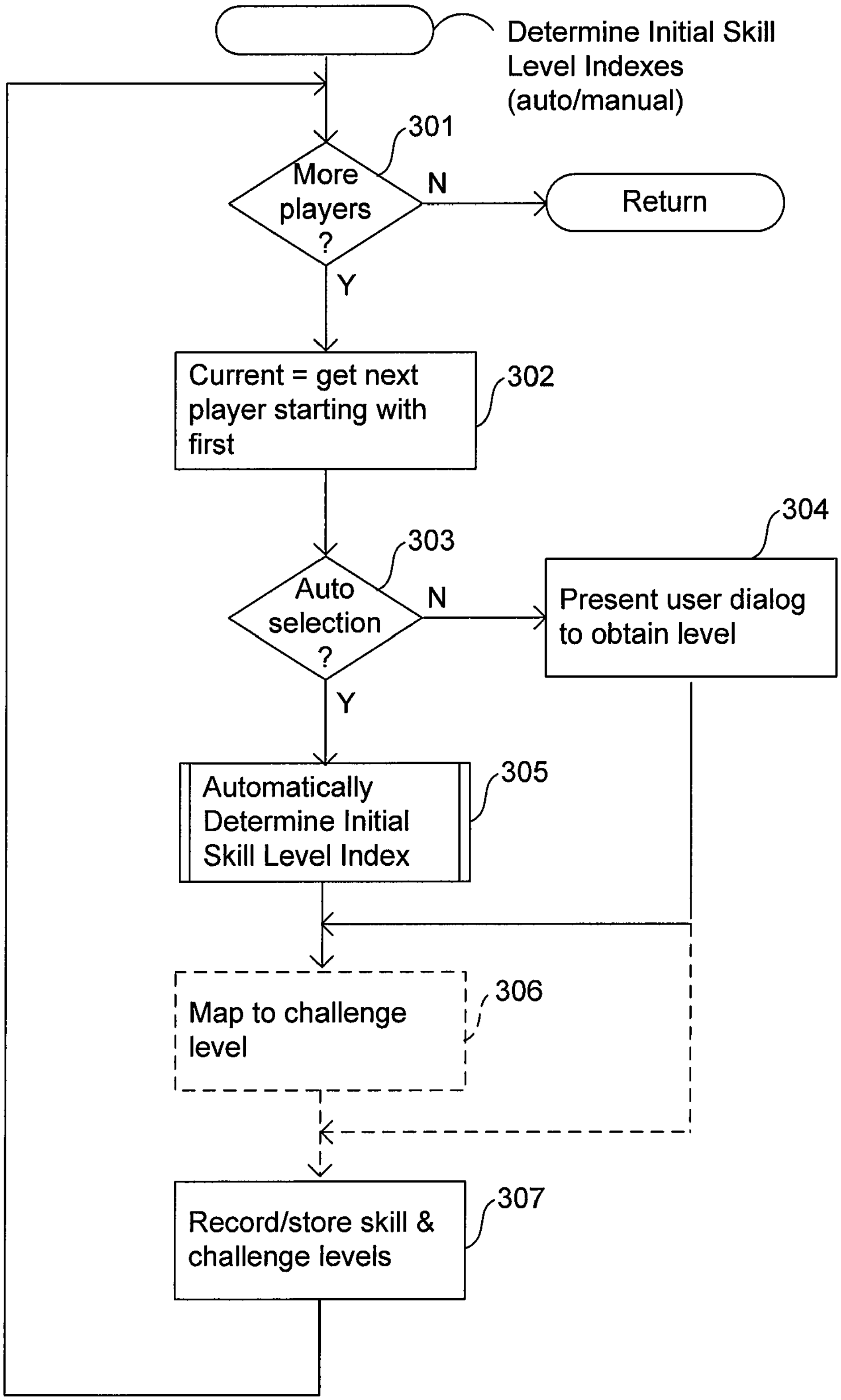
FIG. 3 is an example flow diagram of a routine for determining an initial skill level indexes for game participants.

FIG. 3 is an example flow diagram of a routine for determining an initial skill level indexes for game participants. A designated auto-selection flag (or other stored parameter value) indicates whether the initial determination is to be performed manually or automatically. Steps 301-307 are performed for each participant. Specifically, In step 301, the routine determines whether there are any more participants to process, and, if so, continues in step 302, else returns. In step 302, the routine sets the current participant to the next participant in the list starting with the first. In step 303, the routine determines whether auto-selection has been designated, and, if so, continues in step 305, otherwise continues in step 304. In step 304, the routine presents an appropriate dialog to the current participant, allowing the participant to select a skill/challenge level, and obtains the participant's selection. The routine then continues in step 306 if the participant is permitted to select a skill level rather than a challenge level (the game choosing the corresponding challenge level) or in step 307 if the participant is permitted to select a challenge level. Note again that there may be no distinction in a particular game. In step 305, the routine automatically determines the current participant's initial skill level index. A routine for performing this automatic determination of skill level index is described with reference to FIG. 4. In (optional) step 306, the routine maps the returned initial skill level index to a challenge level if appropriate to the implementation. In step 307, the routine records the current participant's skill level index and/or challenge level, and then returns to step 301 to process the next participant.

Figure 4:
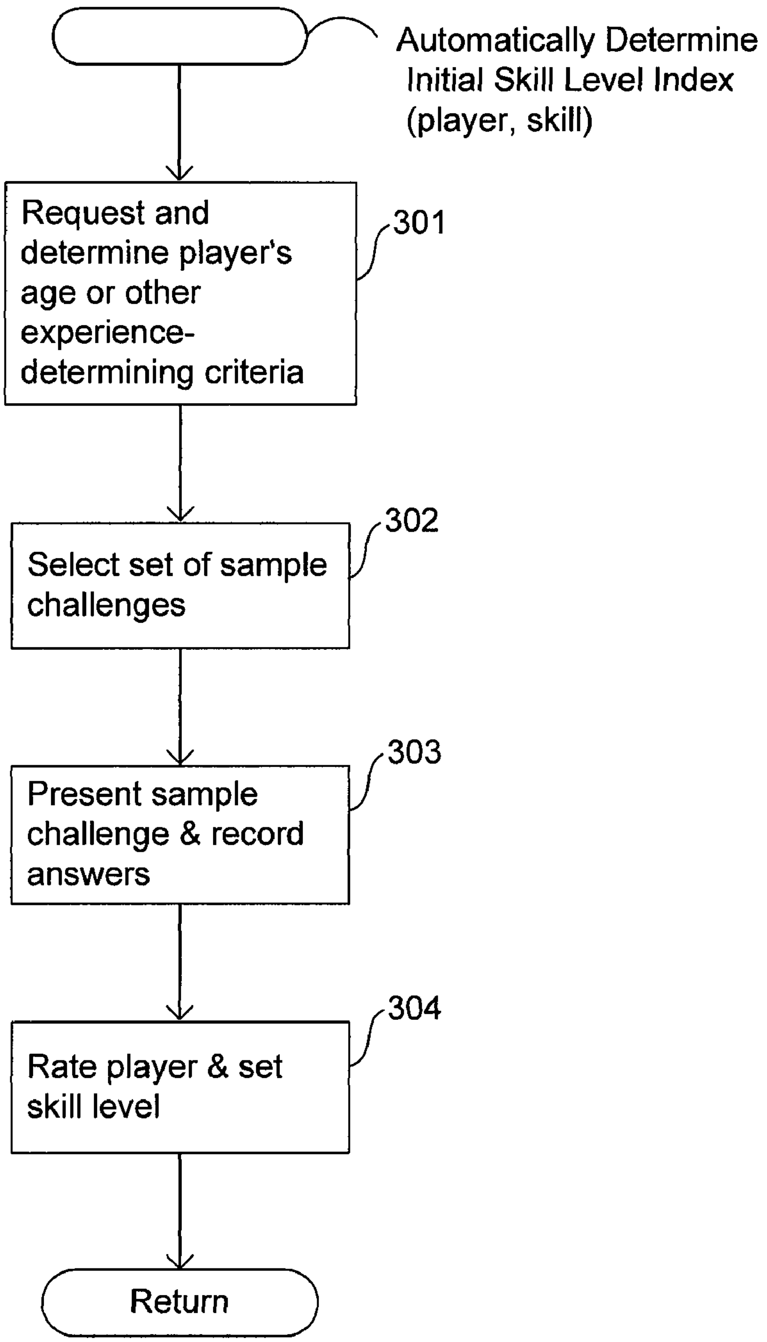
FIG. 4 is an example flow diagram of a routine for automatically determining an initial skill level index for a game participant.

FIG. 4 is an example flow diagram of a routine for automatically determining an initial skill level index for a game participant. An indication of the current participant is designated as an input parameter. The resultant skill level index is returned. The steps illustrated in FIG. 4 are merely exemplary of any number of and type of queries that can be asked of a participant to assist in determining an appropriate initial skill level. It is contemplated that questions even perhaps tailored to the game being played may be presented to gain from the designated participant information that would assist the game in determining an appropriate skill level. One or more of steps 401-404 may be performed as appropriate to the game. For example, in step 401, the routine requests and determines the designated participant's age or other experience determining criteria. Specific inquiries involving year in school (e.g., grade level), countries visited, books read, other games played, are some of the many examples that could be used by the game to automatically determine an initial skill level. In step 402, included in some embodiments, the routine selects a set of sample game content (e.g., challenges), potentially even based upon the answers provided to the questions presented in step 401. In step 403, the routine presents the selected sample challenges and determines the correctness or incorrectness of any responses. In step 404, the routine "rates" the participant according to the answers and responses provided to the previous steps, and assigns a corresponding initial skill level index to the participant (stored, for example, in the participant information data repository 106 of FIG. 1). The routine then returns.

Figure 5:
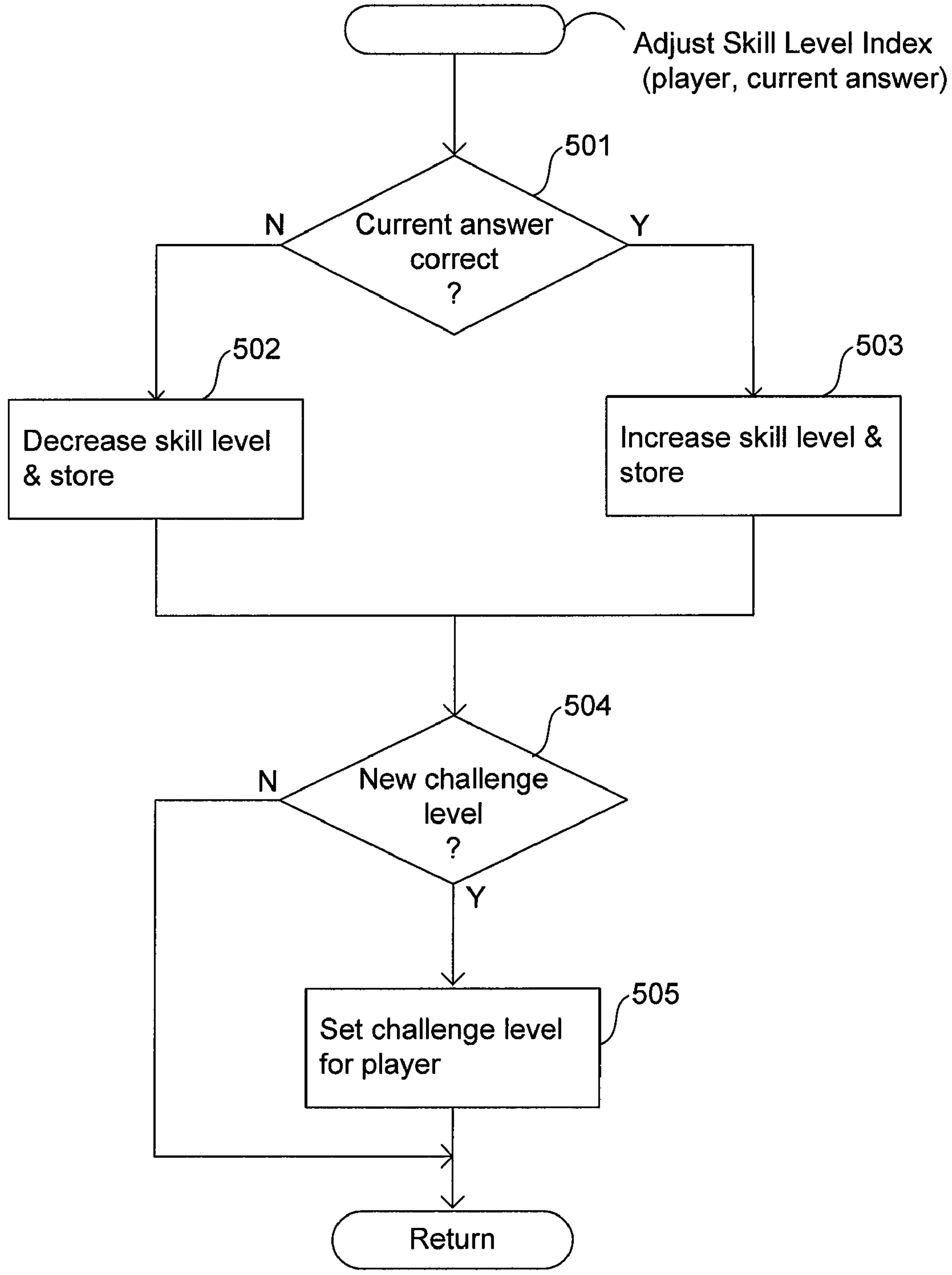
FIG. 5 is an example flow diagram for dynamically adjusting the skill level index of a game participant.

FIG. 5 is an example flow diagram for dynamically adjusting the skill level index of a game participant. This routine is implemented by a DCLA and invoked, for example, in step 207 of FIG. 2. In other embodiments, the skill level index may be adjusted during time periods other than after each challenge is responded to. For example, adjustments may be made on a periodic basis, such as before each challenge, some number of challenges, some timed interval, when a participants requests such a determination etc. The basic steps shown are implemented by a typical DCLA. The particular adjustments made are dependent upon the actual implementation in a particular game. In some embodiments, the game will not allow a participant's skill level index to be lower than the initially chosen skill level. An example implementation in a DVD-based game with dynamic skill level adjustment is described with reference to FIG. 8.

In the example shown in FIG. 5, an indication of the current participant and the participant's response to the most recent presented challenge are designated as input parameters. In step 501, the routine determines whether the designated response was correct or incorrect. The implementation of this step is game dependent and may be handled by the game flow logic. For example, a register or parameter may be used to indicate this information. If the response was correct, then the routine continues in step 503, otherwise continues in step 502. In step 503, the routines makes an appropriate upwards adjustment of the skill level index and stores the value in the participant data as appropriate, and continues in step 504. In step 502, the routines makes an appropriate downwards adjustment of the skill level index and stores the value in the participant data as appropriate, and continues in step 504. Note that the upwards and downwards adjustments may be implemented with opposite logic (e.g., correct answers yielding a downward adjustment) as appropriate to the game, or some other set of heuristics for making adjustments may be used. In addition, adjustments may be made in non-linear increments and/or decrements, and may depend upon the skill level indices of other participants. Many variations are possible. In step 504, the routine determines whether, based upon the newly set skill level index, a change to the challenge level is appropriate, and, if so, continues in step 505, otherwise returns. In step 505, the routine indicates the challenge level that corresponds to the designated participant's new skill level index as the challenge level for the designated participant, and then returns. Dependent upon the implementation, setting or determining a challenge level may be inherent in the skill level index (and not implemented as a separate step) if the mapping between such is handled by the game flow logic (i.e., the game flow logic understands that a participant having a skill level index of "n" maps to a challenge level of "x"), Although the techniques of automatically determining game content based upon dynamically adjusted individual skill levels and the DCLA are generally applicable to any type of electronic game, the phrases "game," "game content," "challenge," "puzzle," "question," etc. are used generally to imply any type of scenario that can be presented to participants to elicit responses that can be scored or represented by a change on a game board. In addition, one skilled in the art will recognize that although the examples described herein often refer to an educational game, the techniques of the present invention can also be used in other environments that would benefit from dynamic content adjustment based upon individual skill levels, such as presenting challenges for certification purposes, testing, etc. In addition, the concepts and techniques described are applicable to all types of platforms that can host or perform such content, including but not limited to personal computers, networked computer systems, computer systems, DVD or DVD-like platforms, handheld gaming consoles, personal digital assistants, etc. Essentially, the concepts and techniques described are applicable to any platform capable of executing the scenarios described herein.

Also, although certain terms are used primarily herein, one skilled in the art will recognize that other terms could be used interchangeably to yield equivalent embodiments and examples. For example, it is well-known that equivalent terms in the multimedia and gaming fields and in other similar fields could be substituted for such terms as "player," "participant," "scoreboard," "audio," "video," etc. Also, the phrase "to present" (and its variations) are used to convey an operation appropriate to the content being presented. For example, when audio is presented it is generally played (to be heard), although accessibility-friendly systems may provide other means for presenting audio. Similarly, when video is presented it is generally displayed, although in some system Braille may be used, or an audio interface used to describe the video. In addition, terms may have alternate spellings which may or may not be explicitly mentioned, and one skilled in the art will recognize that all such variations of terms are intended to be included.

Figure 6:
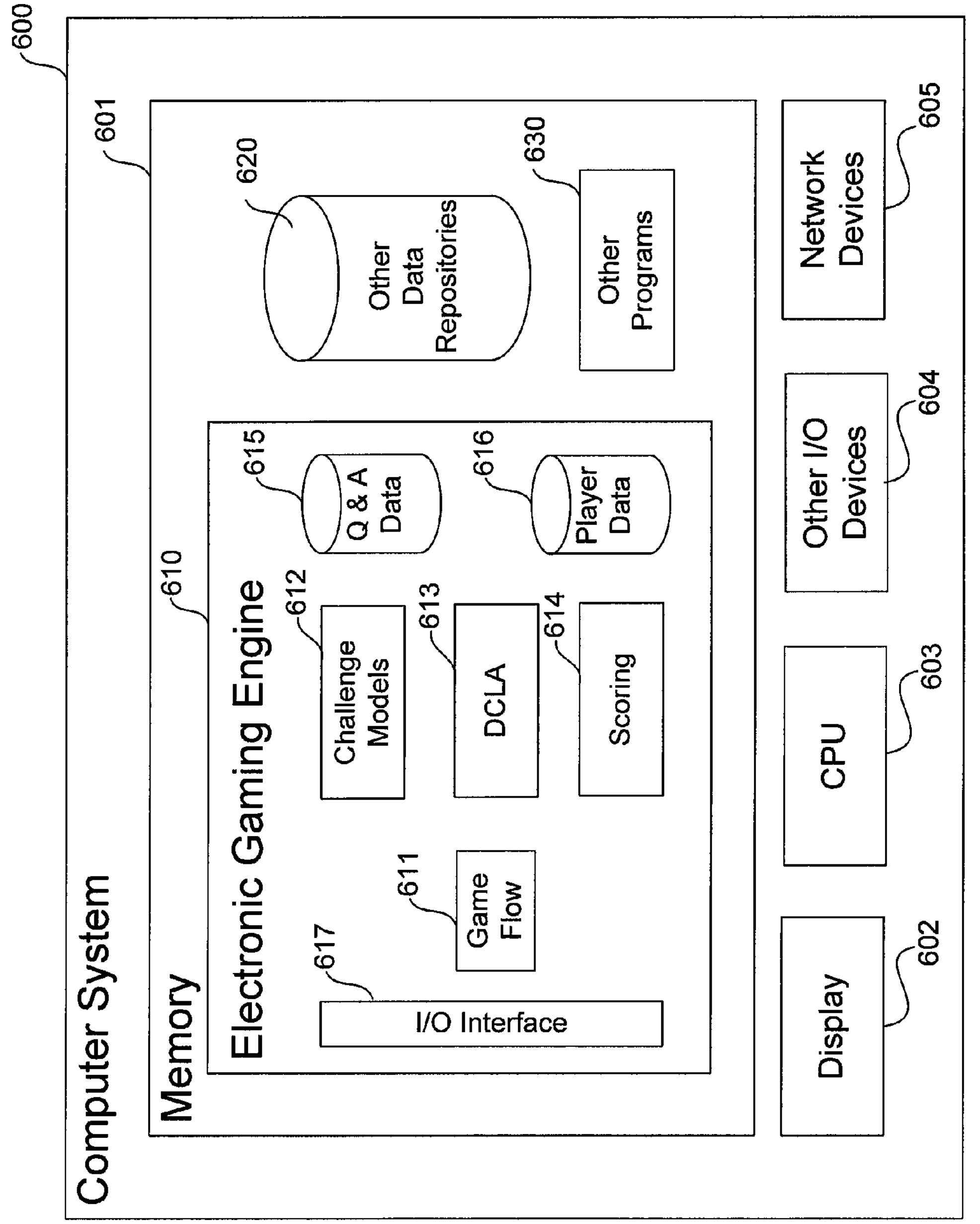
FIG. 6 is an example block diagram of a general purpose computer system for practicing embodiments of an Electronic Gaming Engine including a Dynamic Challenge Level Adjuster.

Example embodiments described herein provide applications, tools, data structures and other support to implement a DCLA to be used for dynamically adjusting game content based upon individual skill levels. FIG. 6 is an example block diagram of a general purpose computer system for practicing embodiments of an Electronic Gaming Engine including a Dynamic Challenge Level Adjuster. One skilled in the art will understand how to apply the embodiment described herein to other electronic platforms. Typically, such platforms incorporate a memory medium of some nature that is used to hold instructions to cause the game or game engine to be performed. Each portion that comprises the Electronic Gaming Engine ("EGE") executes on one or more of such computer systems. Moreover, the general purpose computer system 600 may comprise one or more server and/or client and/or peer computing systems and may span distributed locations. In addition, each block shown may represent one or more such blocks as appropriate to a specific embodiment or may be combined with other blocks. Also, the various blocks of the EGE 610 may physically reside on one or more machines, which use standard inter process communication mechanisms to communicate with each other.

In the embodiment shown, computer system 600 comprises a computer memory ("memory") 601, a display 602, a Central Processing Unit ("CPU") 603, Input/Output devices 604, and network devices 605. The components of the Electronic Gaming Engine 610 are shown residing in memory 601. (The memory 601 includes any type of computer memory including RAM, ROM, DVDs, CDs, and persistent storage such as disk drives.) The components of the EGE 610 preferably execute on CPU 603 and perform electronic game processing, as described in previous figures. Other downloaded code 630 and potentially other data repositories, such as repository 620, also reside in the memory 601, and preferably execute on one or more CPU's 603. In a typical embodiment, the EGE 610 includes game flow logic 611, game content (challenge) models 612, Dynamic Challenge Level Adjuster ("DCLA") 613, scoring module(s) 614, challenge data 615, participant data 616, and a game input/output interface 617. One skilled in the art will recognize that many different arrangements of the components of the EGE 610 are possible.

The components of the EGE may be implemented in hardware, software, or some combination of both, using standard well-known techniques, programming languages, hardware, etc. One skilled in the art will recognize that various object-oriented and distributed methodologies may be used. However, any of the EGE components 611-617 may be implemented using more monolithic programming techniques as well. In addition, programming interfaces to the data stored in the challenge data (content) data repository 615, the participant information data repository 616, or the functions of the DCLA 613 can be made available by standard means such as through C, C++, C#, and Java API and through scripting or tag-based languages such as JavaScript or XML, or through web servers supporting such. The data repositories 615 and 616 that are used to store challenge and participant information are preferably implemented for scalability reasons as one or more databases rather than as a text files. However, any method for storing such information may be used. In addition, the DCLA 613 may be implemented as stored procedures, or methods attached to stored "objects," although other techniques are equally effective.

One skilled in the art will recognize that the EGE including the EGE 610 may be implemented in a distributed environment that is comprised of multiple, even heterogeneous, computer systems and networks. For example, in one embodiment, the game flow logic 611, the challenge models 612, the DCLA 613, the scoring module(s) 614, and the data repositories 615 and 616 are all located in physically different computer systems. In another embodiment, various components of the EGE 610 are hosted each on a separate server machine and may be remotely located from the challenge data 615 and participant data 616. Different configurations and locations of programs and data are contemplated for use with techniques of the present invention. In example embodiments, these components may execute concurrently and asynchronously; thus the components may communicate using well-known message passing techniques. One skilled in the art will recognize that equivalent synchronous embodiments are also supported by an EGE implementation. Also, other steps could be implemented for each routine, and in different orders, and in different routines, yet still achieve the functions of a EGE and of a DCLA.

Figure 7:
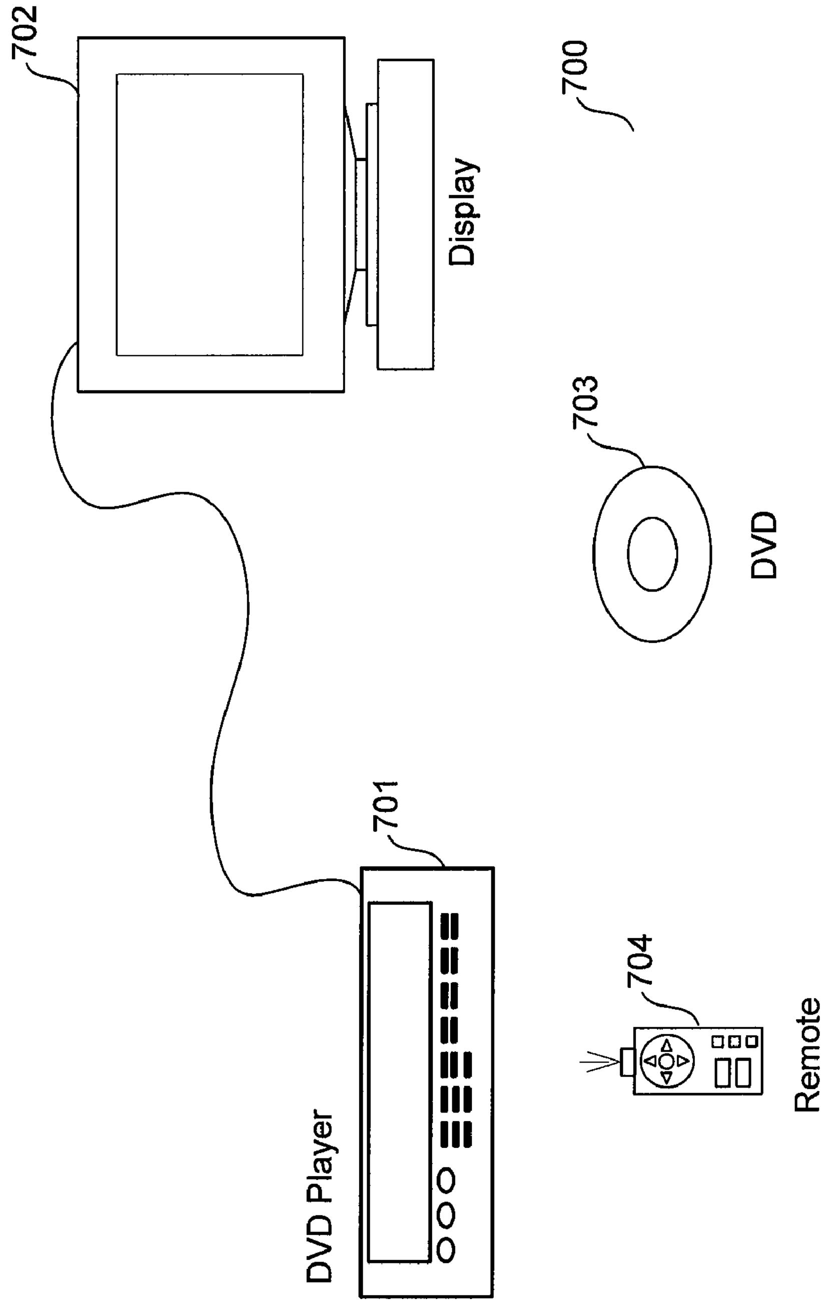
FIG. 7 is an example block diagram of a DVD system for practicing embodiments of an Electronic Game environment including a Dynamic Challenge Level Adjuster.

One particular embodiment of the DCLA has been implemented in a DVD platform and is described in detail in U.S. Provisional Application No. 60/577,446, entitled "DVD Game Architecture." FIG. 7 is an example block diagram of a DVD system for practicing embodiments of an Electronic Game environment including a Dynamic Challenge Level Adjuster. The DVD system 700 comprises a DVD player 701 connected directly or indirectly to a display device 702. In some embodiments, the DVD player 701 may be optionally controlled by a remote control device 704 or by controls resident or otherwise associated with the DVD player 701. A DVD game, which implements the EGE abstractions, along with instructions for controlling the DVD player to present content and to navigate to other content, are stored on a DVD 703 and played on DVD player 701.

Figure 8:
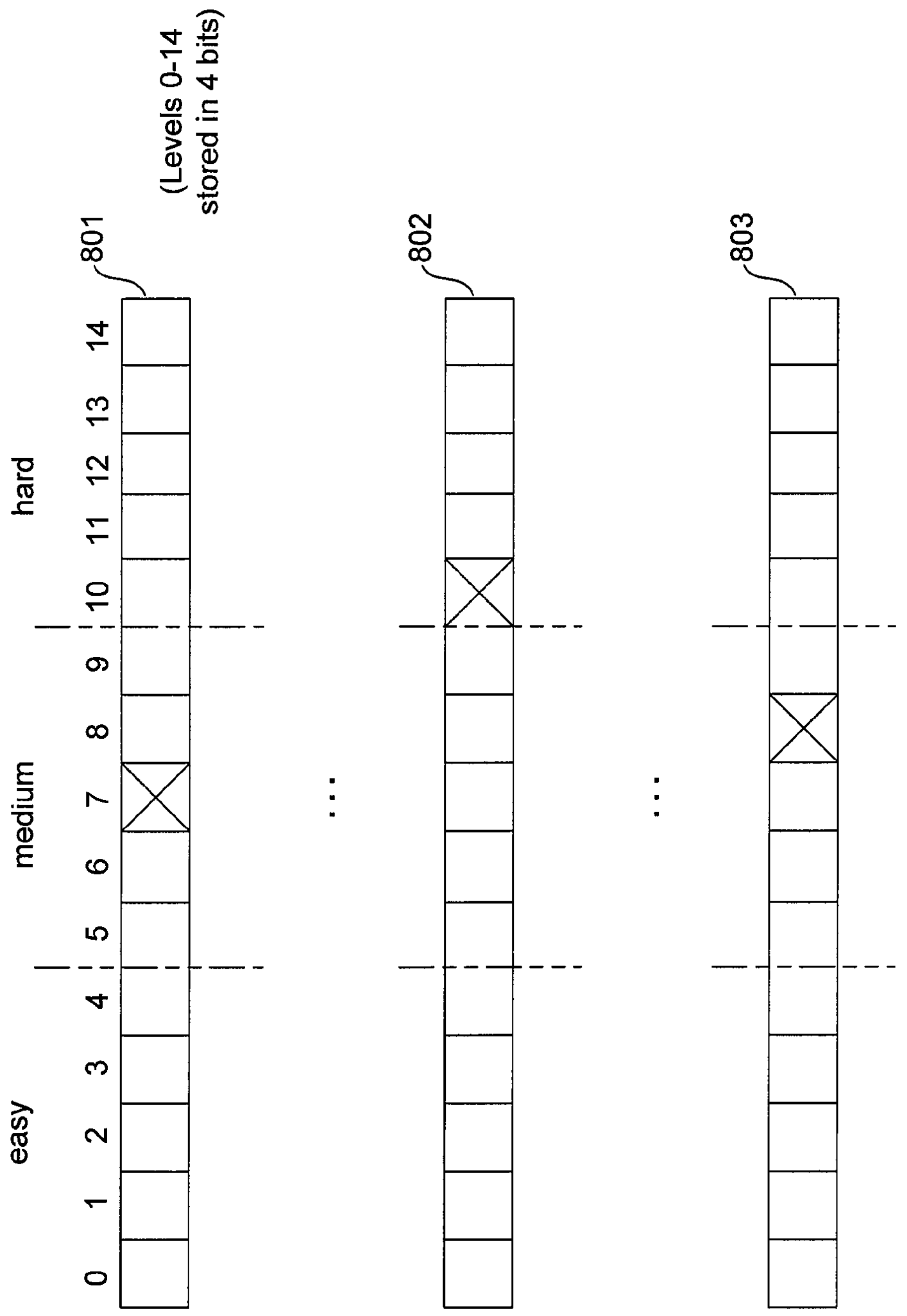
FIG. 8 is an example block diagram of the dynamic adjustment of a skill level index for a participant based upon the participant's responses to game challenges over time in an example DVD-based game.

As described in FIG. 5, the precise logic of any embodiment of a Dynamic Challenge Level Adjuster is dependent upon the game flow logic within which it is executed. FIG. 8 is an example block diagram of the dynamic adjustment of a skill level index for a participant based upon the participant's responses to game challenges over time in an example DVD-based game. This adjustment is available when the dynamic skill level adjustment has been enabled. Note that in the DVD platform, participant (and other information) is stored in general registers; there is very limited memory capacity.

FIG. 8 shows an abstraction of the skill levels available along a continuum 801-803. As implemented in one embodiment, the skill levels range from 0-14, which correspond to three possible groupings of challenge levels: easy, medium, and hard. As shown, skill levels 0-4 are mapped to easy challenges; skill levels 5-9 are mapped to medium challenges; and skill levels 10-14 are mapped to hard challenges. This continuum can be represented in 4 bits of memory and thus a 4-bit value is stored in the general registers for each participant to indicate the participant's current skill level. Note that these mappings and the number of skill levels are modifiable, and that more skill levels are possible based upon what memory tradeoffs are desired. For example, to implement a "hidden" super-easy challenge level, less than 5 skill levels need to be mapped to the other three challenge levels if it is desired to still represent the entire skill level continuum in 4 bits. Alternatively, more bits can be used to represent the continuum thus enabling the same or more skill levels to be mapped to these challenge levels.

When dynamic skill level adjustment has been enabled, a participant's skill level increases for each detected correct answer and decreases for each detected incorrect answer. That way, when the detected correct answers exceed the detected incorrect answers by more than the number of skill levels per challenge level (here, 5 levels), the challenges become more difficult. This adjustment intends to even out the level of play between participants as the game progresses. Skill continuum 801 shows an initial skill level for a game participant. By convention, this initial level is set to a middle value within the challenge level that was initially indicated by the participant or selected automatically by the game. In this example, the easy challenge level corresponds to "cadet;" the medium challenge level to "captain," and the hard challenge level to "commander." Skill continuum 802 shows an automatic adjustment of the participant's skill level increased by 3 levels from the initial skill level shown in skill continuum 801. Similarly, skill continuum 803 shows an automatic adjustment of the participant's skill level decreased by 2 levels from the prior adjustment in continuum 802.

One skilled in the art will recognize that there exist other techniques for implementing automatic adjustment of the skill levels, such as varying the number of skill levels jumped for each challenge, making non-linear adjustments for time-in-the game, etc., and such variances are contemplated for use with the DCLA. For example, the game may implement a scheme that automatically increases a participant's challenge level when 3 challenges have been answered correctly and automatically decreases the participant's challenge level when 2 challenges have been answered incorrectly. To implement this tactic, the game sets the skill level index (0-14) at an appropriate position accordingly and/or changes the number of bits per challenge level accordingly. For some schemes, the game may cause the index to jump non-linearly when a new challenge level is set.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 10/889,985, entitled "METHOD AND SYSTEM FOR DYNAMICALLY LEVELING GAME PLAY IN ELECTRONIC GAMING ENVIRONMENTS," filed Jul. 12, 2004; U.S. Provisional Patent Application No. 60/486,672, entitled "METHOD AND SYSTEM FOR AUTOMATIC HANDICAPPING IN ELECTRONIC GAMING ENVIRONMENTS," filed Jul. 11, 2003, U.S. Provisional Application No. 60/577,446, entitled "DVD GAME ARCHITECTURE, filed Jun. 4, 2004, are incorporated herein by reference, in their entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems for performing automatic presentation of game content based upon dynamically adjusted individual skill levels discussed herein are applicable to other architectures other than a other than a game console based or PC workstation based architecture or a DVD platform. For example, any environment in which the game can be downloaded to memory and game flow influenced by skill-level adjustments can be used. One skilled in the art will also recognize that the methods and systems discussed herein are applicable to differing protocols, communication media (optical, wireless, cable, etc.) and devices, such as wireless handsets, electronic organizers, personal digital assistants, portable email machines, game machines, pagers, navigation devices such as GPS receivers, etc.

The invention claimed is:

1. A computer-implemented method in an electronic game played between a plurality of participants, each participant having an associated skill level index, the game comprising a plurality of challenges presented to the participants in a plurality of turns during the game, comprising:

determining an initial value for the skill level index for at least one of the participants based on characteristics of the participant unrelated to previous experience with the game;

for a turn of a first participant during the game, designating the first participant as a current participant, wherein only a single participant is the current participant at any one time;

automatically selecting by the computer a first next challenge in the game for the first participant based upon a first skill level index associated with the first participant, wherein the first next challenge includes content associated with the game;

presenting by the computer the selected first next challenge;

determining by the computer a first response to the presented first next challenge;

dynamically adjusting the first skill level index associated with the first participant by a first adjustment amount based upon a result of the determined first response, the adjusted first skill level index used for a next turn of the first participant during the game, thereby automatically managing competitive play between the participants during the game; and removing the designation of the first participant as the current participant; and for a turn of a second participant during the game, the turn of the second participant being distinct from the turn of the first participant, after the designation of the first participant as the current participant has been removed, designating the second participant as the current participant;

automatically selecting by the computer a second next challenge in the game for the second participant based upon a second skill level index associated with the second participant, wherein the second next challenge includes content associated with the game;

presenting by the computer the selected second next challenge;

determining by the computer a second response to the presented second next challenge; and dynamically adjusting the second skill level index associated with the second participant by a second adjustment amount based upon a result of the determined second response, the adjusted second skill level index used for a next turn of the second participant during the game, thereby automatically managing competitive play between the participants during the game, wherein at least one of the first and second adjustment amounts are based on a difference between the first skill level index and the second skill level index.

2. The method of claim 1 wherein the determining the initial value for the skill level index comprises determining at least one of an age-based, knowledge-based, or skill-based value for the skill level index.

3. The method of claim 1 wherein the determining the initial value for at least one of the first and second skill level index comprises:

automatically determining an initial skill level index associated with at least one of the first and second participants based upon at least one of (a) querying the current at least one of the first and second participants for age-related, skill-related, or knowledge-related criteria; or (b) presenting at least one sample challenge indicative of skill level.

4. The method of claim 3 wherein querying the at least one of the first and second participants for age-related, skill-related, or knowledge-related criteria comprises querying the at least one of the first and second participants for at least one of age, age group, or grade level.

5. The method of claim 1 wherein the dynamically adjusting at least one of the first and second skill level index comprises:

dynamically adjusting the at least one of the first and second skill level index based upon correctness of the determined first or second response.

6. The method of claim 5 wherein the dynamically adjusting at least one of the first and second skill level index comprises increasing the skill level index for a correct first or second response and decreasing the skill level index for an incorrect first or second response.

7. The method of claim 1 wherein the dynamically adjusting at least one of the first and second skill level index comprises:

dynamically adjusting the at least one of the first and second skill level index by different amounts based upon a current value of the first or second skill level index.

8. The method of claim 1 wherein the dynamically adjusting at least one of the first or second skill level index comprises:

dynamically adjusting the at least one of the first and second skill level index by a first amount when the determined first or second response is correct and a second amount when the determined first or second response is incorrect, the first amount not equal to the second amount.

9. The method of claim 1 wherein the challenges are grouped into challenge level groups, and the automatically selecting at least one of the first and second next challenge comprises:

determining a challenge level from the skill level index associated with the first or second participant; and selecting a first or second next challenge from a challenge level group that corresponds to the determined challenge level for the first or second participant.

10. The method of claim 9 wherein the determining a challenge level comprises determining a challenge level from one of three challenge levels, wherein the challenges are grouped by difficulty into each challenge level.

11. The method of claim 9 wherein the challenge level groups are based upon age, knowledge, or skill.

12. The method of claim 1 wherein the electronic game is a question and answer based game.

13. The method of claim 1 wherein the electronic game is at least one of a trivia-based game, a word game, a puzzle, a time-based question and answer game, or a multiple-choice question and answer game.

14. The method of claim 1 performed by a DVD player, a personal computer, a networked computer system, or a game console.

15. The method of claim 1 wherein the presenting the selected at least one of the first and second next challenge comprises presenting the selected next challenge using at least one of text, video clips, audio clips, still images, graphics, or animations.

16. A tangible computer-readable medium having instructions stored thereon for playing a game between a plurality of participants, each participant having an associated skill level index, the game comprising a plurality of challenges presented to the participants in a plurality of turns, the instructions comprising:

instructions for establishing an initial value for a skill level index based on characteristics of at least one of the participants unrelated to previous experience with the game;

for each sequential turn of a first participant during the game, wherein a sequential turn is executed for only a single participant at a time, instructions for automatically selecting a next challenge in the game based upon a skill level index associated with the first participant;

instructions for sending instructions to a display device to present the selected next challenge;

instructions for determining a response to the presented challenge; and instructions for dynamically adjusting the skill level index associated with the first participant based upon a result of the determined response by a skill level adjustment amount based at least in part upon a skill level index of a second participant, wherein the adjusted skill level index is used for a next turn of the first participant, thereby automatically managing competitive play between the participants.

17. The computer-readable medium of claim 16 wherein the initial value is at least one of age-based, knowledge-based, or skill-based.

18. The computer-readable medium of claim 16 wherein the instructions for establishing the initial value for the skill level index comprises instructions for establishing an initial skill level index associated with the participant based upon at least one of (a) querying the participant for age-related, skill-related or knowledge-related criteria; or (b) presenting at least one sample challenge indicative of skill level.

19. The computer-readable medium of claim 16 wherein the instructions for dynamically adjusting the skill level index comprises instructions for modifying the skill level index based upon correctness of the determined response.

20. The computer-readable medium of claim 19 wherein the instructions for dynamically adjusting the skill level index comprises instructions for increasing the skill level index for a correct response and decreasing the skill level index for an incorrect response.

21. The computer-readable medium of claim 16 wherein the instructions for dynamically adjusting the skill level index comprises instructions for modifying the skill level index in non-linear increments.

22. The computer-readable medium of claim 16 wherein the instructions for dynamically adjusting the skill level index comprises modifying the skill level index by a first amount when the determined response is correct and by a second amount when the determined response is incorrect, the first amount having a different value than the second amount.

23. The computer-readable medium of claim 16 wherein the challenges are grouped into challenge level groups, and wherein the instructions for automatically selecting the next challenge in the game based upon the skill level index associated with the participant comprises:

instructions for determining a challenge level from the skill level index associated with the participant; and instructions for selecting a next challenge from a challenge level group that corresponds to the determined challenge level.

24. The computer-readable medium of claim 23 wherein the challenge level groups are based upon age, knowledge, or skill.

25. The computer-readable medium of claim 16 wherein the electronic game is at least one of a question and answer based game, a trivia-based game, a word game, a puzzle, a time-based question and answer game, or a multiple-choice question and answer game.

26. The computer-readable medium of claim 16, wherein the computer readable medium is capable of causing a computer processor in a DVD player, a personal computer, a networked computer system, or a game console to perform the game.

27. The computer-readable medium of claim 16 wherein the next challenge is presented using at least one of text, video clips, audio clips, still images, graphics, or animations.

28. An electronic game engine for providing a game played between a plurality of participants, each participant having an associated skill level index, the game comprising a plurality of challenges presented to the participants in a plurality of turns during the game, comprising:

an initial skill level assessment module configured to assess an initial value for the skill level index based on information other than prior experience with the game;

a dynamic level adjuster configured to:

retrieve a skill level index associated with a designated participant;

modify the retrieved skill level index based upon a response to a presented challenge, wherein the presented challenge includes game content associated with the game; and store the modified skill level index as the skill level index associated with the designated participant; and a game flow logic module configured to progress the game between participants by, for each participant turn during the game, wherein a turn is executed for only a single participant at a time:

retrieving a skill level index associated with the designated participant;

automatically selecting a next challenge in the game based upon the retrieved skill level index associated with the designated participant, wherein the next challenge includes game content associated with the game;

presenting the selected next challenge;

determining a response to the presented challenge; and invoking the dynamic level adjuster with the determined response to adjust the skill level index associated with the designated participant by an adjustment amount for a next turn of the designated participant during the game, wherein the adjustment amount is based at least in part on a skill level index of at least one other participant, wherein the dynamic level adjuster and the game flow logic module are stored in a memory for execution by the electronic game engine.

29. The engine of claim 28 wherein the initial value is at least one of age-based, knowledge-based, or skill-based.

30. The engine of claim 28 wherein the skill level assessment module automatically determines the initial skill level index associated with the designated participant based upon at least one of (a) querying the designated participant for age-related, skill-related, or knowledge-related criteria; or (b) presenting at least one sample challenge indicative of skill level.

31. The engine of claim 28 wherein the dynamic level adjuster is configured to modify the skill level index associated with the designated participant based upon correctness of the determined response.

32. The engine of claim 31 wherein the dynamic level adjuster is configured to increase the skill level index for a correct response and decrease the skill level index for an incorrect response.

33. The engine of claim 28 wherein the dynamic level adjuster is configured to modify the skill level index by different amounts based upon a current value of the skill level index.

34. The engine of claim 28 wherein the dynamic level adjuster is configured to modify the skill level index by different amounts depending upon whether the determined response is correct or incorrect.

35. The engine of claim 28 wherein the challenges are grouped into challenge level groups and the game flow logic module is configured to select the next challenge from one of the challenge level groups based upon the retrieved skill level index.

36. The engine of claim 35 wherein the challenge level groups are based upon age, knowledge, or skill.

37. The engine of claim 28 wherein the game is at least one of a question and answer based game a trivia-based game, a word game, a puzzle, a time-based question and answer game, or a multiple-choice question and answer game.

38. The engine of claim 28 executed by a DVD player, a personal computer, a networked computer system, or a game console.

39. The engine of claim 28 wherein the selected next challenge is presented using at least one of text, video clips, audio clips, still images, graphics, or animations.

40. A tangible computer-readable medium having stored thereon instructions that, if executed by a computer system, cause the computer system to perform an interactive electronic game with a plurality of participants, the game being presented on a display device associated with the computer system, the instructions comprising:

(a) instructions for determining a next current participant from the plurality of participants, wherein only a single participant is the next current participant at a time;

(b) instructions for assessing an initial skill level of at least one of the participants from information other than prior experience with the game;

(c) instructions for retrieving a skill level of the at least one of the participants;

(d) instructions for automatically selecting a next challenge for the current participant during the game based upon the retrieved skill level, wherein the next challenge comprises a question associated with the game;

(e) instructions for presenting the next challenge and determining the result; and (f) instructions for automatically adjusting, based upon the determined result, the skill level associated with the current participant by a skill level adjustment amount and storing the adjusted skill level, wherein the skill level adjustment amount is at least partially based on a skill level of at least one other participant.

41. The computer-readable medium of claim 40 wherein the instructions for assessing the initial skill level for the participant comprise instructions for automatically by querying the participant for age-related, knowledge-related, or experience-related criteria, or by presenting at least one sample challenge indicative of skill level and determining a response thereto.

42. The computer-readable medium of claim 40 wherein the instructions for dynamically adjusting the skill level index comprise:

instructions for dynamically adjusting the skill level index associated with the participant based upon correctness of the determined response.

43. The computer-readable medium of claim 42 wherein the instructions for dynamically adjusting the skill level index comprise instructions for increasing the skill level index for a correct response and decreasing the skill level index for an incorrect response.

44. The computer-readable medium of claim 40 wherein the instructions for dynamically adjusting the skill level index comprise:

instructions for dynamically adjusting the skill level index associated with the participant by a non-linear amount.

45. The computer-readable medium of claim 40 wherein the instructions for dynamically adjusting the skill level index comprise:

instructions for dynamically adjusting the skill level index associated with the participant a first amount when the determined response is correct and a second amount when the determined response is incorrect, the first amount not equal to the second amount.

46. The computer-readable medium of claim 40 wherein the interactive electronic game is at least one of a trivia-based game, a word game, a puzzle, a question and answer game, a time-based question and answer game, or a multiple-choice question and answer game.

47. The computer-readable medium of claim 40 wherein the presented challenge is at least one of a multiple-choice question, a time limited challenge, or a true/false challenge.

* * * * *

UNITED STATES PATENT AND TRADEMARK OFFICE

CERTIFICATE OF CORRECTION

PATENT NO. : 8,105,153 B2
APPLICATION NO. : 11/955205
DATED : January 31, 2012
INVENTOR(S) : Buecheler et al.

It is certified that error appears in the above-identified patent and that said Letters Patent is hereby corrected as shown below:

Page 2, item (56), under "Other Publications", in Column 2, Line 3, delete "Aricificial" and insert -- Artificial --.

Column 14, line 44, in Claim 26, delete "computer readable" and insert -- computer-readable --.

Column 15, line 4, in Claim 28, delete "time:" and insert -- time, --.

Column 16, lines 28-29, in Claim 41, delete "automatically by querying" and insert -- automatically querying --.

Signed and Sealed this
Thirty-first Day of July, 2012

David J. Kappos
*Director of the United States Patent and Trademark Office*